3,050,494
COMPOSITIONS COMPRISING AN OLEFIN POLYMER, CARBON BLACK, AND A DITHIOBISBENZOTHIAZOLE, AND PROCESS FOR CURING SAME
Archie L. Robbins and Kenneth R. Mills, Bartlesville, Okla., assignors to Phillips Petroleum Company, a corporation of Delaware
No Drawing. Filed Oct. 30, 1958, Ser. No. 770,582
10 Claims. (Cl. 260—41)

This invention relates to solid olefin polymer-carbon black compositions.

In a further aspect, this invention relates to a method of producing these new compositions.

The incorporation of carbon black in solid polymers of 1-olefins such as polyethylene and polypropylene is well known in the art. Small amounts, generally less than five percent and frequently less than one percent, have been used to stabilize the polymer against deterioration in the presence of ultraviolet light. Larger amounts ranging as high as 75 parts per hundred parts of polymer or even higher have been added as a filler, contributing increased hardness, stiffness and heat distortion values.

These highly loaded compositions have greatly reduced tensile values, much lower elongation, and are quite brittle. Melt index values are greatly reduced as higher amounts of black are used.

As a means for alleviating the drawbacks inherent in these highly loaded compositions, the incorporation of peroxidic materials such as dicumyl peroxide has been disclosed. While some improvement over the objectionable features of the unmodified compositions is realized by such additives, they have a powerful effect on melt index which becomes apparent when heated to about 250° F., which may be incurred during incorporation of the additive and if not at that time, would be reached during process steps in fabrication of articles from the resin. Melt index lowering in such instances is sufficiently great to render extrusion or injection molding techniques very difficult if not impossible. This problem is accentuated in the case of the high density polyethylenes produced in low pressure polymerization procedures since these polymers require considerably higher processing temperatures than do those produced in high pressure polymerization operations.

The following are objects of our invention.

An object of our invention is to provide new solid olefin polymer-carbon black compositions. A further object of our invention is to provide a novel process for curing compositions comprising solid polymers of olefins with high carbon black loadings. A further object of our invention is to provide a new cured composition comprising polyethylene and at least 25 parts by weight of carbon black per 100 parts polymer. A further object of our invention is to provide a process for producing these new compositions.

Other objects and advantages of this invention will be apparent to those skilled in the art upon reading this disclosure.

Broadly, our invention is based upon the discovery of a process comprising blending a solid polymer of a 1-olefin of 2 to 8 carbon atoms with at least 25 parts by weight of carbon black and an amount sufficient to cure said solid polymer of a compound of the structure

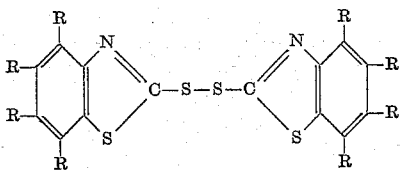

where each R is individualy selected from the group consisting of hydrogen, halogen, and alkyl groups and where the carbon atoms in the sum of the R groups attached to an aromatic ring does not exceed 6, and thereafter heating the mixture to provide a cured composition.

More particularly, the invention resides in the production of polyethylene compositions containing from 25 to 400 parts carbon black per 100 parts of polymer, these compositions having melt indices which make them processable in conventional equipment and which have a tensile strength about equal to the unfilled polymer and brittleness substantially less than that of compositions in which no additive is used. As the curing agent, we use, as above set forth, 2,2'-dithiobisbenzothiazole and certain derivatives thereof. Examples of these derivatives which are operable in this invention include: 2,2'-di(4-methylbenzothiazyl) disulfide; 2,2'-di(5-methylbenzothiazyl) disulfide; 2,2'-di(5,6-dimethylbenzothiazyl) disulfide; 2,2'-di(4,7-dimethylbenzothiazyl) disulfide; 2,2'-di(4,5 - diethylbenzothiazyl) disulfide; 2,2'-di(5-methyl-6-ethylbenzothiazyl) disulfide; 2,2'-di(4,5,6,7-tetramethylbenzothiazyl) disulfide; 2,2'-di(4,5,6-trimethylbenzothiazyl) disulfide; 2,2'-di(5,6,7-trimethylbenzothiazyl) disulfide; 2,2'-di(7-isopropylbenzothiazyl) disulfide; 2,2'-di(5,6 - di - n - propylbenzothiazyl) disulfide; 2,2'-di(4-n-butylbenzothiazyl) disulfide; 2,2'-di(5-tert-butylbenzothiazyl) disulfide; 2,2'-di(6-n-amylbenzothiazyl) disulfide; 2,2' - di(4 - n-hexylbenzothiazyl) disulfide; 2,2'-di(4-chlorobenzothiazyl) disulfide; 2,2' - di(4-chlorobenzothiazyl) disulfide; 2,2'-di(4-bromobenzothiazyl) disulfide; 2,2' - di(5,6-difluorobenzothiazyl) disulfide; 2,2'-di(5,6-diiodobenzothiazyl) disulfide; 2,2' - di(7-fluorobenzothiazyl) disulfide; 2,2'-di(6-iodobenzothiazyl) disulfide; 2,2'-di(4 - methyl-5-chlorobenzothiazyl) disulfide; 2,2'-di(5-n - propyl-6-bromobenzothiazyl) disulfide; 2,2'-di(4,7-dichlorobenzothiazyl) disulfide; 2,2'-di(6,7-dibromobenzothiazyl) disulfide; 2,2' - di(5-ethyl-6,7-dichlorobenzothiazyl) disulfide; 2 - (4 - methylbenzothiazyl) - 2' - (5-ethylbenzothiazyl) disulfide; 2-(5-methyl-6-ethylbenzothiazyl)-2'-(4,5,6,7-tetramethylbenzothiazyl) disulfide, and 2,2'-di(4,5,6,7 - tetrachlorobenzothiazyl) disulfide. Mixtures can be used, if desired.

Olefin polymers prepared in either high pressure or low pressure polymerization systems are applicable in the process of the present invention. Polyethylene and polypropylene are of greatest commercial importance at the present time. However, the invention is applicable to polymers of 1-olefins containing up to 8 carbon atoms such as 1-butene, 1-pentene, 4-methyl-1-pentene, 1-hexene, 1-heptene, and 1-octene. It is also applicable to copolymers such as the copolymer prepared by polymerizing ethylene and propylene.

The carbon blacks used will preferably be those of large particle size although the improvements realized by the use of the additives of our invention are applicable and effective with any commercial black. Channel blacks are quite satisfactory. Other suitable types include the furnace blacks, both thermal and combustion.

Blending of the black with polyethylene can be effected by roll-milling or in a Banbury and the additive can be added before, during, or subsequent to addition of the black. A preferred procedure is to work the polyethylene on a roll mill at an elevated temperature until molten, then add the black incrementwise continuing the rolling until a homogeneous blend is obtained. The additive is then incorporated to the hot blend, continuing for a few minutes to secure thorough dispersion throughout the mass.

The blending is carried out at a temperature above the melting point of the polymer of the 1-olefin but below that at which the additive will cure the composition.

The maximum temperature for this blending is generally below 350° F. To obtain the cure, the blend is heated to a temperature of at least 425° F. and, generally, in the range of 450 to 600° F. The temperature should not be so high as to cause substantial degradation of the polymer. The time of heating is related to the amount of additive used, times within the range of 30 seconds to 30 minutes being normally satisfactory. The shorter cure times are used when the larger amounts of additive are used and vice versa.

The amount of 2,2'-dithiobisbenzothiazole or derivative thereof used is sufficient to result in a cure of the mixture of olefin polymer and carbon black. For this purpose, the amount can range from 0.1 to 10, preferably 0.5 to 5, parts by weight per 100 parts of the olefin polymer.

*Example I*

Two compositions were prepared in each of which 50 parts of furnace thermal carbon black (Thermax) was incorporated in 100 parts of Type 9 Marlex polyethylene by milling on a roll mill. The rolls for all the milling steps were heated by steam to a temperature of 310° F. and the polyethylene was milled until molten. The black was added in increments over a period of about five minutes and milling continued for about five minutes after addition was complete. To one portion was then added two parts of 2,2'-dithiobisbenzothiazole and milling continued for about another five minutes. This portion was then cured at 450° F. for 20 minutes. The compositions were then evaluated to provide the following data. Corresponding data on the parent polyethylene is shown for comparison:

| Composition | Melt [a] Index | Density, gm./cc. | Impact [b] Strength | Hardness,[c] Shore D | Tensile [d] (p.s.i.) | Elong.,[d] Break, percent | Stiffness,[e] (p.s.i.) |
|---|---|---|---|---|---|---|---|
| 1. Polyethylene | 0.70 | 0.961 | 4.2 | 68 | 4,450 | 24 | 159,000 |
| 2. Polyethylene and black | 0.34 | 1.145 | 0.95 | 73 | 2,823 | 2 | 177,000 |
| 3. Polyethylene, black and 2,2'-dithiobisbenzothiazole | 0.21 | 1.146 | 1.68 | 68 | 4,513 | 5 | 162,000 |

[a] ASTM 1238-57T.
[b] Izod. Foot pounds/inch notch.
[c] ASTM D676-55T.
[d] Compression molded specimen at yield. Pulled at 20 inches/minute ASTM D638-52T.
[e] ASTM D747.

*Example II*

A series of compositions was made using Type 9 Marlex polyethylene to which was added 50 parts of the same carbon black as in Example I and varying amounts of dicumyl peroxide. Melt indices were obtained on these compositions to demonstrate the effect of this additive as compared with a control containing 2,2'-dithiobisbenzothiazole. The amount of each additive is based on 100 parts by weight of polyethylene. The portion containing the dicumyl peroxide was cured at 320° F. for 20 minutes and the portion containing the 2,2'-dithiobisbenzothiazole was cured at 450° F. for 20 minutes. The melt index was determined according to ASTM 1238-57T using the standard load of 2,160 grams except when indicated. The results are shown in the following table.

| Additive, parts | 0.2 | 0.5 | 2.0 | 3.0 | 5.0 |
|---|---|---|---|---|---|
| Dicumyl peroxide | [1]2.44 | 0.01 | | [1]0 | |
| 2,2'-dithiobisbenzothiazole | | | 0.21 | | 0.49 |

[1] Weight 10 times standard (21,600 grams).

These data show that the 2,2'-dithiobisbenzothiazole permits processing of the composition at higher temperatures than possible with dicumyl peroxide.

For this work the density is determined by compression molding of the polyethylene at a temperature of 340° F. in a mold provided with a water jacket through which water can be circulated. The sample is maintained at about 340° F. until it is completely molten. It is then cooled from 340 to 200° F. at the rate of approximately 10 Fahrenheit degrees per minute. Water is then circulated through the mold to continue the cooling to 150° F., the rate not exceeding 20 Fahrenheit degrees per minute. The polyethylene is then removed from the mold and cooled to room temperature. A small piece of the solidified polyethylene is cut from the compression molded sample and inspected to make sure that it is free of voids and that it has a sufficiently smooth surface to prevent the trapping of air bubbles thereon. The small sample is placed in a 50-ml. glass-stoppered graduate. Carbon tetrachloride and methylcyclohexane are then allowed to run into the graduate from separate burettes in such proportions that the sample is suspended in the mixed solution, i.e., it neither floats nor sinks. The graduate is shaken during the addition of liquid in order that the two liquids mix thoroughly. A total liquid volume of 15 to 20 ml. is required. After the liquids have been so proportioned that the polyethylene is suspended therein without sinking or floating, the density of the liquid mixture is equal to the density of the solid polyethylene. The polyethylene is then removed from the liquid and a portion of the liquid mixture of carbon tetrachloride and methylcyclohexane is transferred to a Westphal balance and the specific gravity of the liquid is measured at a temperature in the range 73 to 78° F. This specific gravity is equal to the specific gravity of the polyethylene. For most practical purposes, the specific gravity can be considered identical to the density. However, if a precise conversion to actual density units (grams per cc.) is desired, this is readily referable to water at 4° F. by calculations which will readily be evident to those skilled in the art. The precision of a single specific gravity determination is ordinarily within ±.0002.

As many possible embodiments can be made of this invention without departing from the scope thereof, it is to be understood that all matter herein set forth is to be interpreted as illustrative and not as unduly limiting the invention.

We claim:

1. A composition of matter comprising, as the sole polymeric material, a solid hydrocarbon polymer of a 1-olefin of 2 to 8 carbon atoms, at least 25 parts by weight of carbon black per 100 parts of said solid polymer, the amount of said black being sufficient to change appreciably the properties of said solid polymer, and as the sole curing agent an amount sufficient to cure said solid polymer of a compound of the structure

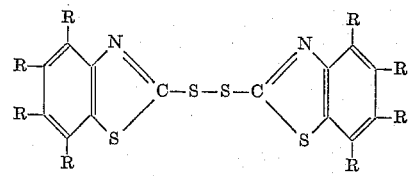

where each R is individually selected from the group consisting of hydrogen, halogen, and alkyl groups and where the carbon atoms in the sum of the R groups attached to an aromatic ring does not exceed 6.

2. A composition of matter comprising, as the sole polymeric material, 100 parts by weight of polyethylene, 25 to 400 parts by weight of carbon black, and as the sole curing agent 0.1 to 10 parts by weight of a compound of the formula

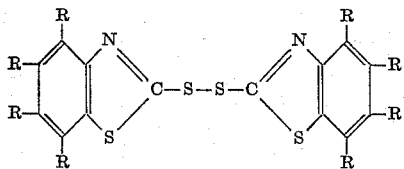

where each R is individually selected from the group consisting of hydrogen, halogen, and alkyl groups and where the carbon atoms in the sum of the R groups attached to an aromatic ring does not exceed 6.

3. A composition of matter comprising, as the sole polymeric material, 100 parts by weight of polyethylene, 25 to 400 parts by weight of carbon black, and as the sole curing agent 0.1 to 10 parts by weight of 2,2'-dithiobisbenzothiazole.

4. A composition of matter comprising, as the sole polymeric material, 100 parts by weight of polyethylene, 25 to 400 parts by weight of carbon black, and as the sole curing agent 0.5 to 5 parts by weight of 2,2'-dithiobisbenzothiazole.

5. A composition of matter comprising, as the sole polymeric material, 100 parts by weight of polyethylene, 50 parts by weight of carbon black and as the sole curing agent 2 parts by weight of 2,2'-dithiobisbenzothiazole.

6. A process comprising blending, as the sole polymeric material, a solid hydocarbon polymer of a 1-olefin of 2 to 8 carbon atoms with at least 25 parts by weight of carbon black and, as the sole curing agent, an amount sufficient to cure said solid polymer of a compound of the structure

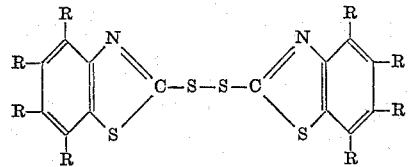

where R is selected from the group consisting of hydrogen, halogen, and alkyl groups and where the carbon atoms in the sum of the R groups attached to an aromatic ring does not exceed 6, and thereafter heating the mixture at a temperature in the range of 425 to 600° F. to provide a cured composition.

7. A process comprising blending, as the sole polymeric material, 100 parts by weight of polyethylene, 25 to 400 parts by weight of carbon black, and, as the sole curing agent, 0.1 to 10 parts by weight of a compound of the formula

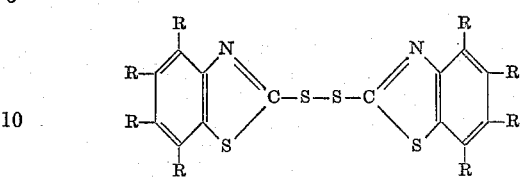

where R is selected from the group consisting of hydrogen, halogen, and alkyl groups and where the carbon atoms in the sum of the R groups attached to an aromatic ring does not exceed 6, and heating the blend at 425 to 600° F. to cure the same.

8. A process comprising blending, as the sole polymeric material, 100 parts by weight of polyethylene, 25 to 400 parts by weight of carbon black, and, as the sole curing agent, 0.1 to 10 parts by weight of 2,2'-dithiobisbenzothiazole, and heating the blend at 425 to 600° F. to cure the same.

9. A process comprising blending, as the sole polymeric material, 100 parts by weight of polyethylene, 25 to 400 parts by weight of carbon black, and, as the sole curing agent, 0.5 to 5 parts by weight of 2,2'-dithiobisbenzothiazole, and heating the blend at 425 to 600° F. to cure the same.

10. A process comprising blending, as the sole polymeric material, 100 parts by weight of polyethylene, 50 parts by weight of carbon black, and, as the sole curing agent, 2 parts by weight of 2,2'-dithiobisbenzothiazole, and heating the blend at 425 to 600° F. to cure the same.

References Cited in the file of this patent

UNITED STATES PATENTS

| | | |
|---|---|---|
| 2,234,215 | Youker | Mar. 11, 1941 |
| 2,582,510 | Stiratilli | Jan. 15, 1952 |
| 2,890,187 | Bowman et al. | June 9, 1959 |
| 2,927,904 | Cooper | Mar. 8, 1960 |
| 2,955,102 | Clayton et al. | Oct. 4, 1960 |
| 2,967,850 | Hawkins et al. | Jan. 10, 1961 |
| 2,992,202 | Lemiszka et al. | July 11, 1961 |

FOREIGN PATENTS

| | | |
|---|---|---|
| 532,665 | Great Britain | Jan. 29, 1941 |
| 570,138 | Great Britain | June 25, 1945 |
| 589,499 | Great Britain | June 23, 1947 |